Oct. 21, 1969    A. G. GOSS ET AL    3,473,853
VIBRATION DAMPING DEVICE
Filed March 13, 1967
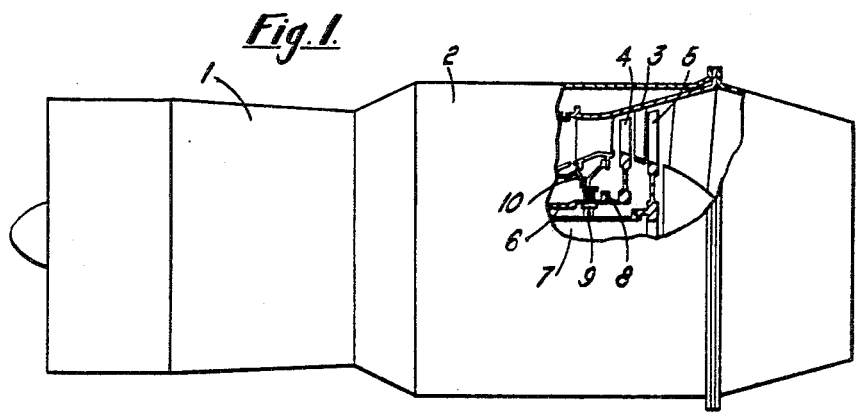
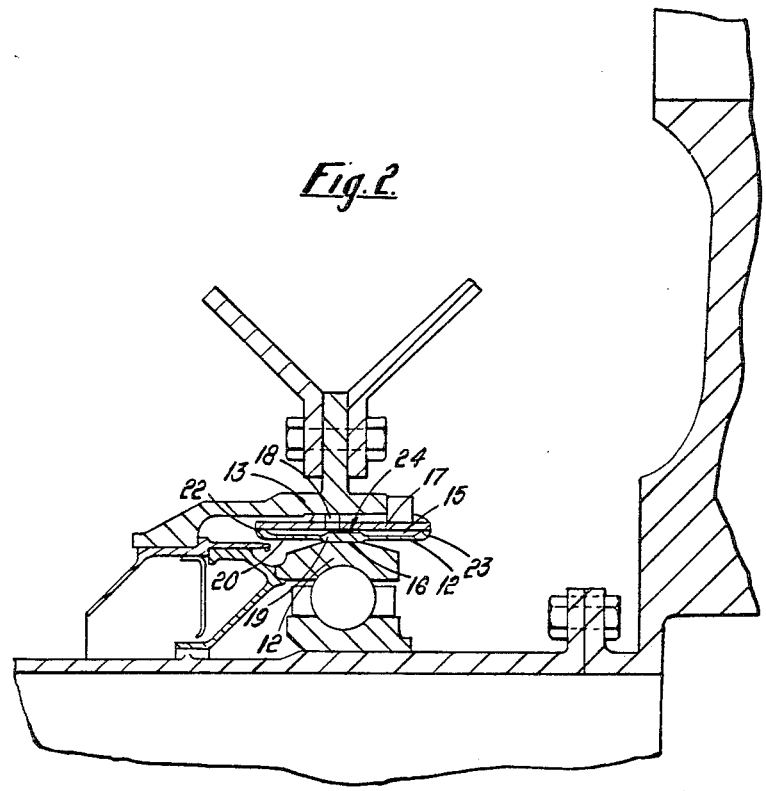

3,473,853
VIBRATION DAMPING DEVICE
Arthur G. Goss, Barrow-on-Trent, and Arthur Bill, Derby, England, assignors to Rolls-Royce Limited, Derby, England, a British company
Filed Mar. 13, 1967, Ser. No. 622,609
Claims priority, application Great Britain, Mar. 25, 1966, 13,205
Int. Cl. F16c 13/00, 39/00, 35/00
U.S. Cl. 308—15                                    4 Claims

ABSTRACT OF THE DISCLOSURE

A bearing for a gas turbine engine is provided with a hollow annular member fitted between the bearing outer race and the housing and containing a sealed squeeze film for vibration damping.

---

This invention relates to vibration damping devices and relates in particular to devices which employ hydrodynamic squeeze films.

According to the present invention a vibration damping device comprises a first dished member, a second member connected to the first member in a fluid tight manner to form therewith a closed space between the two members, said space being filled with fluid and one member being provided with a land which projects into the closed space from the surface of one of the members forming a gap between the land and the adjacent surface of the other member, the gap being such that on relative approaching or receding movement of the land and said adjacent surface, a hydrodynamic squeeze film is produced in the gap, one of the members being only sufficiently flexible to allow said relative movement.

Preferably the liquid in the space is oil.

The invention also includes a bearing in which such a vibration damping device is disposed between a bearing race and structure which is fixed relative to said race.

The invention further includes a gas turbine engine incorporating a bearing as described above.

The invention will now be described in more detail, merely by way of example, with reference to the accompanying drawings in which:

FIGURE 1 shows a cutaway view of a gas turbine engine illustrating bearing means incorporating the vibration damping device of the present invention.

FIGURE 2 is an enlarged sectional view of part of the bearing means of FIGURE 1.

Referring now to the drawings a gas turbine engine comprises compressor means 1, combustion equipment 2 and turbine means 3 mounted in flow series in the usual manner. The turbine means 3 has an H.P. stage 4 and an L.P. stage 5 mounted on concentric shafts 6 and 7 respectively. The shafts 6 and 7 rotate in bearings 8 and 9 respectively which are supported from the fixed structure 10.

FIGURE 2 shows in more detail the H.P. turbine stage 4 and the bearing 8. The bearing 8 comprises an inner race 11 which is mounted on the shaft 6, an outer race 12 which is connected to fixed structure 13 and a plurality of balls or rollers 14 mounted for rolling engagement therebetween.

A vibration damping device, indicated generally by the numeral 15, is disposed between the outer race 12 and the fixed structure 13.

The device 15 comprises a metal member 16, in the form of an annulus having a concave or dished outer surface, and a cylindrical sleeve 17 having smooth inner and outer surfaces, the sleeve being arranged to fit over the member 15 so that a closed space is formed therebetween. The member 16 is formed with a pair of holes 18 through which oil may be injected into the closed space.

The member 16 comprises a thickened central portion 19 from which extend two relatively thin arms 20 and 21 at the end of which are flanges 22 and 23 respectively.

The inner surface of the member 16 is adapted to fit over the outer race 12 of the bearing, the thickened portion only being in contact therewith. On the radially outer surface of the member 16 the thickened central portion 19 projects upwards to form a land 24 the height of which is slightly less than the height of the flanges 22 and 23. Thus in assembly, the land forms a small gap between its surface and the sleeve 17.

The thickness of the arms 20 and 21 are arranged so that a predetermined amount of flexibility is provided and if necessary one or more convolutions may be formed in the arms to provide the flexibility required.

The bearing and vibration damping device may be assembled as follows. The metal member 16 is fitted over the outer race 12 of the bearing and welded in position by an electron beam welding process or other suitable method at the thickened central portion 19.

The sleeve 17 is fitted over the member 16 and welded at the flanges 22 and 23 to form a sealed space. Oil is poured into the space through the holes 18 until the space is completely filled and the holes 18 are then plugged. The assembled unit may then be fitted and welded in position in the fixed structure 13 before the whole assembly is fitted into the engine.

In operation radial vibrations of the shaft 6 cause radial movement of the bearing. Due to the flexibility of the arms 20 and 21, relative radial movement takes place between the land 24 and the inner surface of the sleeve 17.

The film of oil in the gap between the land 24 and the sleeve 17 therefore changes in thickness and the thickness of the gap is so arranged that on relative approaching and receding movement between the land and the inner surface of the sleeve 17 a hydrodynamic squeeze film of oil is formd in said gap.

The hydrodynamic squeeze film of oil is effective in damping the radial vibrations of the shaft 6.

It is clear that several alternative constructions of the device 15 could be used and would be just as effective in damping vibrations.

For example the sleeve 17 may have a concave inner surface and the member 16 may be cylindrical. The land may be disposed on either of the member 16 or 17.

The vibration damping device has been described as being disposed between the outer bearing and fixed structure. This however, is not meant to preclude its use on the intershaft bearing 9.

In this event the sleeve 17 is connected to the internal surface of the shaft 6 in a manner which prevents relative rotation between the shaft 6 and the bearing outer race.

We claim:
1. A means for creating a hydrodynamic squeeze film between at least two structural elements for preventing the transmission of vibrations from one of said elements to the other comprising:

an annular first dished member connected to one of said structural elements, an annular second member connected to the other of said structural elements and adapted to be joined with said first annular dished member in a fluid-tight manner in order to define there between an annular closed space, a quantity of fluid filling said space, said fluid having the property that when used between surfaces that are subjected to pressures, a hydrodynamic squeeze film will be developed, and a continuous annular land disposed on one of said annular members and projecting into said annular closed space towards said other annular member for defining an annular gap between said land and said other annular member within said closed space which is narrower than the remainder of said closed space and arranged for exerting pressure on said fluid at said gap upon relative approaching and receding movement of said land and said other annular member whereby hydrodynamic squeeze film will be developed at said gap, said one of said annular members being only sufficiently flexible as to allow said relative movement.

2. The means as claimed in claim 1 and in which said fluid is oil.

3. The means as claimed in claim 1 and in which said second annular member comprises a sleeve which fits over the radially outer periphery of the first annular member to form the annular closed space.

4. The means of claim 1 and in which one of said annular members is disposed on a bearing race and the other of said annular members is attached to fixed structure forming a bearing housing.

References Cited

UNITED STATES PATENTS

| 2,602,009 | 7/1952 | Barlow et al. | 308—26 |
| 2,631,901 | 3/1953 | Holben et al. | 308—184 X |
| 3,101,979 | 8/1963 | Mard | 308—26 |
| 3,122,399 | 2/1964 | Hunter | 308—26 X |
| 3,140,901 | 7/1964 | Young | 308—26 |
| 3,322,474 | 5/1967 | Destival | 308—26 |
| 3,357,757 | 12/1967 | Morley et al. | 308—26 |

FOREIGN PATENTS

| 22,815 | 10/1913 | Great Britain. |
| 921,720 | 3/1963 | Great Britain. |
| 1,036,487 | 8/1958 | Germany. |
| 935,520 | 11/1955 | Germany. |

MARTIN P. SCHWADRON, Primary Examiner

FRANK SUSKO, Assistant Examiner

U.S. Cl. X.R.

308—26, 84